(12) United States Patent
Kutsumizu et al.

(10) Patent No.: US 9,500,418 B2
(45) Date of Patent: Nov. 22, 2016

(54) GRAPHITE COMPOSITE FILM

(71) Applicant: KANEKA CORPORATION, Osaka-shi, Osaka (JP)

(72) Inventors: Makoto Kutsumizu, Settsu (JP); Yasushi Nishikawa, Settsu (JP); Yusuke Ohta, Settsu (JP); Satoshi Katayama, Settsu (JP); Takashi Inada, Settsu (JP); Takashi Inada, Settsu (JP)

(73) Assignee: KANEKA CORPORATION, Osaka-Shi, Osaka (JP)

( * ) Notice: Subject to any disclaimer, the term of this patent is extended or adjusted under 35 U.S.C. 154(b) by 0 days.

(21) Appl. No.: 14/372,343

(22) PCT Filed: Jan. 11, 2013

(86) PCT No.: PCT/JP2013/000082
§ 371 (c)(1),
(2) Date: Jul. 15, 2014

(87) PCT Pub. No.: WO2013/108600
PCT Pub. Date: Jul. 25, 2013

(65) Prior Publication Data
US 2015/0024231 A1    Jan. 22, 2015

(30) Foreign Application Priority Data
Jan. 16, 2012    (JP) .................................. 2012-006404

(51) Int. Cl.
*B32B 9/00*    (2006.01)
*F28F 21/02*    (2006.01)
(Continued)

(52) U.S. Cl.
CPC ............... *F28F 21/02* (2013.01); *B23B 35/00* (2013.01); *B23K 26/384* (2015.10); *C01B 31/04* (2013.01);
(Continued)

(58) Field of Classification Search
CPC ............. Y10T 428/30; C01B 31/04–31/0423; B32B 9/007

USPC ........................... 428/408; 423/448; 165/185
See application file for complete search history.

(56) References Cited

U.S. PATENT DOCUMENTS

| 5,879,807 A | 3/1999 | Inoue et al. |
| 2007/0072056 A1 | 3/2007 | Oh et al. |

(Continued)

FOREIGN PATENT DOCUMENTS

| CN | 1937292 A | 3/2007 |
| JP | 8-267647 A | 10/1996 |

(Continued)

OTHER PUBLICATIONS

Chinese Office Action and Search Report, issued Feb. 3, 2015, for Chinese Application No. 201380004346.2, along with an English translation of the Search Report.

(Continued)

*Primary Examiner* — Daniel H Miller
(74) *Attorney, Agent, or Firm* — Birch, Stewart, Kolasch & Birch, LLP

(57) ABSTRACT

There is provided a graphite composite film including a graphite film and a metal layer formed on a surface of the graphite film, in which peeling-off of the metal layer from the graphite film is suppressed. More specifically, the graphite composite film includes a graphite film and a metal layer formed on at least one side of the graphite film, wherein the graphite film has a plurality of through holes formed therein, a metal layer is formed also inside the through holes so as to be connected to the metal layer formed on a surface of the graphite film, the metal layer inside the through holes is formed continuously from the one side to an opposite side of the graphite film, and a distance between outer diameters of the through holes is 0.6 mm or less and a ratio of an area of metal inside the through holes to an area of the graphite composite film is 1.4% or more.

18 Claims, 6 Drawing Sheets

(51) Int. Cl.
  *C01B 31/04* (2006.01)
  *C23C 28/00* (2006.01)
  *B23B 35/00* (2006.01)
  *F28F 21/08* (2006.01)

(52) U.S. Cl.
  CPC .............. *C23C 28/00* (2013.01); *F28F 21/089* (2013.01); *Y10T 428/12361* (2015.01); *Y10T 428/24273* (2015.01); *Y10T 428/24339* (2015.01); *Y10T 428/30* (2015.01)

(56) References Cited

U.S. PATENT DOCUMENTS

| | | | | |
|---|---|---|---|---|
| 2008/0149322 A1* | 6/2008 | Ottinger et al. | ............... | 165/185 |
| 2010/0112283 A1* | 5/2010 | Howarth et al. | ............... | 428/137 |
| 2011/0265980 A1 | 11/2011 | Kubo et al. | | |

FOREIGN PATENT DOCUMENTS

| | | |
|---|---|---|
| JP | 2001-177024 A | 6/2001 |
| JP | 2003-234444 A | 8/2003 |
| JP | 2006-269643 A | 10/2006 |
| JP | 2006-298700 A | 11/2006 |
| JP | 2006-298718 A | 11/2006 |
| JP | 2006-322813 A | 11/2006 |
| JP | 2007-123348 A | 5/2007 |
| JP | 2007-123516 A | 5/2007 |
| JP | 2010-64391 A | 3/2010 |
| JP | 2011-5775 A | 1/2011 |
| KR | 10-2008-0031741 A | 4/2008 |
| WO | WO 2011/007510 A1 | 1/2011 |

OTHER PUBLICATIONS

International Search Report, issued in PCT/JP2013/000082, dated Feb. 5, 2013.
Database WPI, Week 200679, Thomson Scientific, AN 2006-770477, XP002742170, 1 page.
Database WPI, Week 200715, Thomson Scientific, AN 2007-143292, XP002742169, 2 pages.
Database WPI, Week 201023, Thomson Scientific, AN 2010-D22852, XP-002742168, 2 pages.
Extended European Search dated Jul. 27, 2015, for European Application No. 13738775.9.

* cited by examiner

US 9,500,418 B2

GRAPHITE COMPOSITE FILM

TECHNICAL FIELD

The present invention relates to a graphite composite film including a graphite film and a metal layer formed on the surface of the graphite film.

BACKGROUND ART

A graphite film offers high heat dissipation performance due to its high heat conductivity, but has low surface activity and therefore has poor adhesion to resins or metals or other materials. For example, when a graphite film is used as a heat dissipator for substrates, a resin layer made of a resin such as an epoxy resin may be directly formed on the surface of the graphite film, but void formation or separation is likely to occur between the graphite film and the resin layer when molding is performed under conditions where pressure or heat is applied. Further, when such a graphite film having a resin layer formed on the surface thereof is exposed to high temperature in, for example, a soldering process, there is a case where separation or delamination occurs between the graphite film and the resin layer due to the difference in linear expansivity between the graphite film and the resin because the adhesion strength between the graphite film and the resin layer is poor.

On the other hand, when combined with a metal plate, a graphite film may be brazed with solder or the like but is poor in affinity for solder. Therefore, it is difficult to join a graphite film to a metal plate with solder.

In order to solve such problems, a method has been disclosed in which a metal layer is formed on the surface of a graphite film to form a graphite composite film (Patent Document 1).

Patent Document 1: JP-A-2001-177024

DISCLOSURE OF THE INVENTION

Problems to be Solved by the Invention

According to the method disclosed in Patent Document 1, a metal layer is directly formed on the surface of a graphite film. However, the graphite film has very poor adhesion to metal due to its low surface activity, and therefore there is a problem that the metal layer is easily peeled off during heat treatment or handling.

It is therefore an object of the present invention to provide a graphite composite film including a graphite film and a metal layer formed on the surface of the graphite film, in which peeling-off of the metal layer from the graphite film is suppressed.

Means for Solving the Problems

More specifically, the present invention provides a graphite composite film including a graphite film and a metal layer formed on at least one side of the graphite film, wherein the graphite film has a plurality of through holes formed therein, wherein the through holes also have a metal layer formed inside thereof so as to be connected to the metal layer formed on a surface of the graphite film, and the metal layer inside the through holes is formed continuously from the one side to an opposite side of the graphite film, and wherein a distance between outer diameters of the through holes is 0.6 mm or less and a ratio of an area of metal inside the through holes to an area of the graphite composite film is 1.4% or more.

It is preferred that the metal layer on the surface of the graphite film is formed by plating.

It is preferred that the graphite film has a hole area ratio of 1.4% or more but 40.0% or less.

It is preferred that the through holes have a diameter of 0.90 mm or less.

The graphite film may further include a solder layer formed on a surface of the metal layer formed on the surface of the graphite film.

The present invention also provides a method for forming a graphite composite film, including the step of forming a metal layer on at least one side of a graphite film having a plurality of through holes formed therein and inside the through holes to obtain a graphite composite film, wherein a distance between outer diameters of the through holes is 0.6 mm or less and a ratio of an area of metal inside the through holes to an area of the graphite composite film is 1.4% or more.

It is preferred that the production method further includes the step of forming through holes in a polymer film or a carbonized film as a raw material film and then graphitizing the raw material film by heat treatment to obtain the graphite film having a plurality of through holes formed therein.

The production method may further include the step of directly forming through holes in a graphite film with a drill or laser to obtain the graphite film having a plurality of through holes formed therein.

The present invention also provides a graphite film having a plurality of through holes formed therein, the graphite film having a distance between outer diameters of the through holes of 0.6 mm or less and a hole area ratio of 1.4% or more.

Effects of the Invention

According to the present invention, it is possible to obtain a graphite composite film including a graphite film and a metal layer formed on the surface of the graphite film, in which peeling-off of the metal layer from the graphite film is suppressed.

PREFERRED MODE FOR CARRYING OUT THE INVENTION

A graphite composite film according to the present invention is obtained by forming a metal layer on one or both sides of a graphite film. Further, a solder layer, a resin layer made of a resin such as an epoxy resin, or a polymer film may be laminated on the outer surface of the metal layer.

Figure 1:
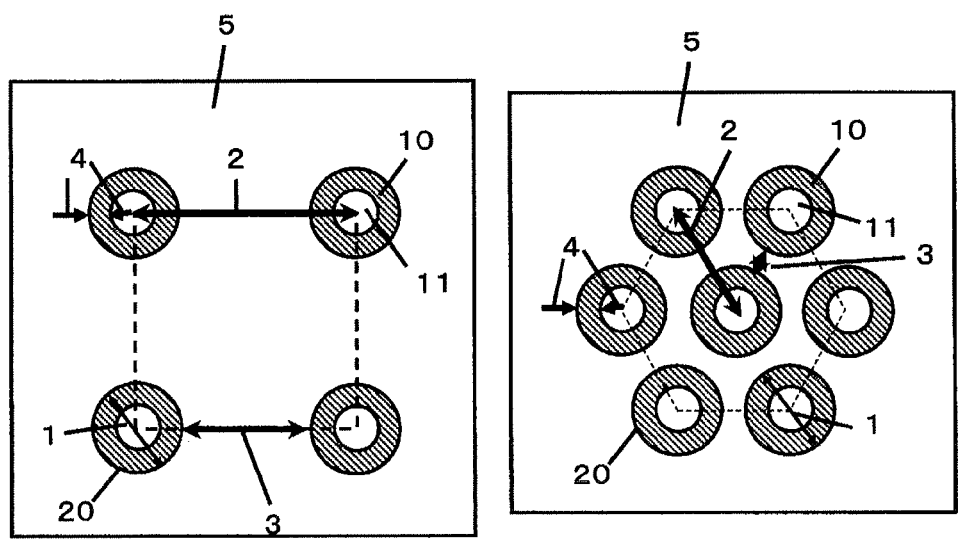
FIG. 1 is a partially-enlarged view of the surface of a graphite composite film according to the present invention.

The graphite film has a plurality of through holes formed therein in its thickness direction. The through holes shall be formed so as to pass through the graphite film from one side to the opposite side of the graphite film. The shape of the through holes is not particularly limited, but is preferably, for example, circular cylindrical, elliptic cylindrical, or the like for ease of formation. The arrangement of the through holes present in the graphite film is not particularly limited, but the through holes are preferably regularly arranged. For example, as shown in FIG. 1, the through holes are preferably arranged at regular intervals.

In the present invention, the through holes of the graphite film also have a metal layer formed inside thereof. Such a metal layer inside the through holes is formed so as to be connected to the metal layer formed on the surface of the graphite film, and is continuously formed from one side to the opposite side of the graphite film. Such a structure makes it possible to suppress peeling-off of the metal layer on the surface of the graphite film from the graphite film.

Figure 6:
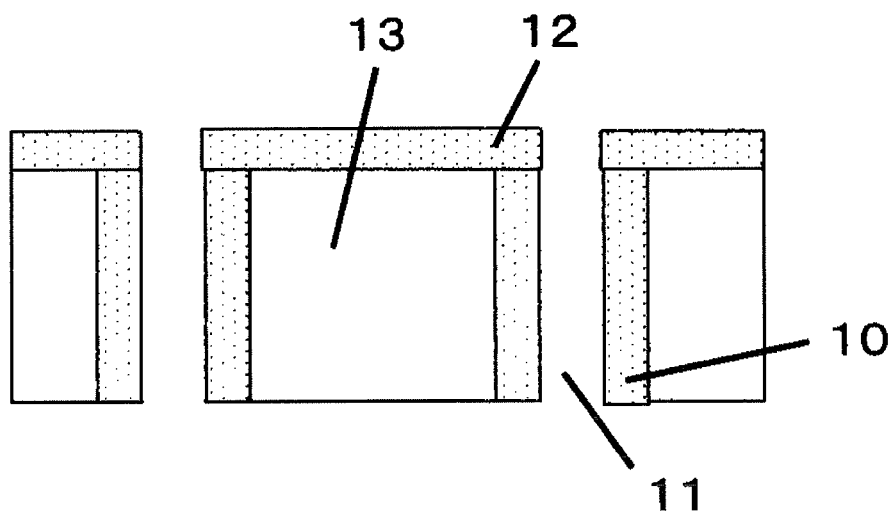
FIG. 6 is a sectional view showing through holes of a graphite composite film of Example 22.

More specifically, when the metal layer is formed on only one side of the graphite film, the metal layer inside the through holes is formed so as to be connected to the metal layer on the one side of the graphite film and to have, in the thickness direction of the graphite film, a length that is at least the same as the thickness of the graphite film (see FIG. 6). In this case, a metal layer having an area corresponding to the area of the metal layer inside the through holes is formed also on the other side of the graphite film on which no metal layer is formed, which makes it possible to suppress peeling-off of the metal layer from the graphite film.

In the present invention, the phrase "the metal layer inside the through holes is formed from one side to the opposite side of the graphite film" means that, as shown in FIG. 6, the metal layer inside the through holes needs to extend so that the end of the metal layer inside the through holes is at least flush with the surface of the graphite film on which no metal layer is formed (hereinafter, also referred to as "surface on which no metal layer is formed"). However, the metal layer inside the through holes may further extend beyond the surface on which no metal layer is formed. For example, the metal layer inside the through holes may protrude through the surface on which no metal layer is formed.

On the other hand, when the metal layer is formed on both sides of the graphite film, the metal layer inside the through holes is connected to both the metal layers on both sides of the graphite film. That is, the metal layers on both sides of the graphite film are connected to each other through the metal layer inside the through holes. This makes it possible to effectively suppress peeling-off of the metal layers from the graphite film. In this case, the metal layer inside the through holes is of course formed from one side to the opposite side of the graphite film.

(Distance Between Outer Diameters of Through Holes)

In the present invention, the distance between the outer diameters of the through holes formed in the graphite film is 0.60 mm or less, preferably 0.20 mm or less, more preferably 0.10 mm or less. When the distance between the outer diameters of the through holes is 0.60 mm or less, peeling-off of the metal layer formed on the surface of the graphite film can be suppressed by the metal layer formed inside the through holes even when the graphite composite film is exposed to high temperature during, for example, soldering. This improves, for example, soldering heat resistance.

FIG. 1 is a partially-enlarged top view of the surface of the graphite composite film according to the present invention. It is to be noted that in FIG. 1, the metal layer formed on the surface of the graphite film is not shown in order to explain the metal layer inside the through holes. Reference sign 3 denotes the distance between the outer diameters of the through holes. The term "distance between the outer diameters of the through holes" herein refers to the shortest distance between the outer diameter of one of the through holes and the outer diameter of another of the through holes adjacent to and nearest the one of the through holes. At this time, the metal layer inside the through holes is not taken into consideration, and only the graphite film is taken into consideration. In order to determine the distance between the outer diameters of the through holes in consideration of only the graphite film, for example, the graphite film may be exposed by melting the metal layer to measure the distance between the outer diameters of the through holes. For example, when a plurality of through holes having an outer diameter of 50 μm are formed so that the pitch between the through holes is 100 μm, the distance between the outer diameters of the through holes is 50 μm.

When a through-hole part metal area ratio, which will be described later, is the same, a smaller distance between the outer diameters of the through holes makes peel strength greater. Therefore, the distance between the outer diameters of the through holes may be appropriately selected depending on the diameter of the through holes.

Further, the ratio of the through holes having a metal layer formed inside thereof to all the through holes is preferably 70% or more, more preferably 80% or more, even more preferably 90% or more. The phrase "the ratio of the through holes having a metal layer formed inside thereof to all the through holes is 70% or more" means that, for example, when 1000 through holes are present, 700 or more of the through holes have a metal layer formed inside thereof.

(Method for Forming Through Holes)

A method for forming the through holes is not particularly limited, but may be, for example, a method using a drill or a method using a laser. The graphite film having through holes formed therein may be obtained by directly forming through holes in a graphite film or by forming through holes in a polymer film or a carbonized film as a raw material film of a graphite film and then subjecting the raw material film to heat treatment to obtain a graphite film. Formation of through holes in a polymer film or a carbonized film as a raw material film makes it possible to suppress formation of burrs around the through holes. This makes it easy, when a metal layer is formed, to properly form a metal layer inside the through holes, and therefore the metal layer can have higher soldering heat resistance or holding strength. Particularly, formation of through holes in a polymer film or a carbonized film as a raw material film is preferred because a metal layer is properly formed inside the through holes even when the through holes are as small as 0.2 mm or less.

(Ratio of Area of Metal Inside Through Holes)

In the present invention, the ratio of the area of metal formed inside the through holes formed in the graphite film to the area of the graphite composite film (hereinafter, referred to as "through-hole part metal area ratio" or "ratio of the area of metal inside the through holes to the area of the graphite composite film") is 1.4% or more, preferably 4.2% or more. When the through-hole part metal area ratio is 1.4% or more, it is possible to prevent peeling-off of the metal layer from the surface of the graphite film even when a peel test is performed. Further, when the through-hole part metal area ratio is 4.2% or more, it is possible to improve the interlaminar strength of the graphite film as well as to improve the strength between the graphite film and metal, which makes it possible to obtain a graphite composite film having high interlaminar strength.

A method for calculating the through-hole part metal area ratio will be described below.

FIG. 1 is a partially-enlarged view of the surface of the graphite composite film according to the present invention. Referring to FIG. 1, the ratio of the area of metal inside the through holes to the area of the graphite composite film refers to the ratio of the total area of metal 10 inside the through holes (i.e., the total area of metal portions inside the through holes when the film is viewed from above as shown in FIG. 1) to the total surface area of one side of a graphite composite film 5 including through holes 11 remaining after formation of metal and the metal 10 inside the through holes.

When the metal layer is formed by plating and the thickness of the metal layer formed on one side of the graphite film is smaller than the radius of the through holes, the area (A) of the metal 10 inside the through holes is calculated by the following formula from a diameter 1 of the through holes (R), a thickness 4 of metal inside the through holes (Tm), and the number of the through holes (n). When the through holes are classified into two or more groups according to their outer diameter, the area (A) of the metal 10 inside the through holes can be determined by calculating the area of the metal 10 inside the through holes for each individual group by the formula 1 and summing the areas of the individual groups.

[Formula 1]

$$A = ((R/2)^2 \pi - ((R/2) - Tm)^2 \pi) \times n \quad \text{(Formula 1)}$$

In this regard, the outer diameter of the through holes of the graphite film having a metal layer formed thereon is measured in the following manner: the graphite film having a metal layer formed thereon is immersed in an aqueous $FeCl_3$/HCl solution (etching liquid) at 40° C. to remove the metal layer, and the outer diameter of the through holes of the graphite film from which the metal layer has been removed is measured with a laser microscope LEXT OLS 4000 manufactured by Olympus Corporation.

On the other hand, when the thickness of the metal layer formed on one side of the graphite film is larger than the radius of the through holes, the through holes are completely blocked with metal, and therefore the area of the metal 10 inside the through holes is the same as the area of through holes 20 excluding metal (i.e., the area of the through holes when the film is viewed from above as shown in FIG. 1).

The area of the graphite composite film refers to the area of the graphite composite film in the surface direction thereof. For example, when the graphite composite film has a thickness of 40 μm and a size of 50 mm×50 mm, the area of the graphite composite film is 2500 mm². The area of the graphite composite film in the surface direction thereof (in this specification, also simply referred to as "area in the surface direction") is the area of the surface of the film perpendicular to the thickness direction of the film. The area of the graphite composite film in the surface direction thereof can be measured by measuring the area of one side of such a graphite film as shown in FIG. 1.

The configuration of the present invention is evaluated by the graphite composite film as a whole. However, when the area in the surface direction exceeds a certain level, for example, 1 m² and part of the graphite composite film satisfies the requirements of the present invention, the effects of the present invention are exhibited in the part of the graphite composite film. Therefore, the graphite composite film, the whole of which does not satisfy the requirements of the present invention but part of which satisfies the requirements of the present invention, is also included in the present invention.

Examples of a method for controlling the through-hole part metal area ratio include: 1) increasing the thickness 4 of the metal layer inside the through holes; 2) increasing the hole area ratio of the graphite film; and 3) increasing the number of the through holes. When formed by plating, the metal layer is formed on the surface of the graphite film and inside the through holes at the same time, and therefore the metal layer formed on one side of the graphite film and the metal layer formed inside the through holes have the same thickness. Therefore, when the metal layer is formed by plating and the hole area ratio of the graphite film is not changed, the through-hole part metal area ratio can be increased by increasing the thickness of plating. However, when the through holes are completely blocked with the metal layer, the through-hole part metal area ratio is not increased even when the thickness of plating is further increased. On the other hand, when the thickness of plating is not changed, the through-hole part metal area ratio can be increased by increasing the hole area ratio or the number of the through holes.

(Metal Layer Formed on Surface of Graphite Film)

The metal layer formed on the surface of the graphite film may be formed on the entire surface of the graphite film or may be formed on part of the surface of the graphite film. When formed on part of the surface of the graphite film, the metal layer is preferably formed around the through holes. Further, the metal layer formed on the surface of the graphite film is connected to the metal layer inside the through holes, and preferably, the metal layers formed on both sides of the graphite film are connected to each other through the metal layer inside the through holes. It is to be noted that also when the metal layers on both sides of the graphite film are connected to each other through the metal layer inside the through holes, the metal layer on the surface of the graphite film may be formed on the entire surface of the graphite film or may be formed on part of the surface of the graphite film.

(Hole Area Ratio of Graphite Film)

The hole area ratio of the graphite film is preferably 1.4% or more but 40.0% or less, more preferably 1.4% or more but 19.0% or less, even more preferably 4.2% or more but 19.0% or less, most preferably 4.2% or more but 12.0% or less. The hole area ratio of the graphite film herein refers to the ratio of the total area of the through holes (i.e., the total area of the through holes when the film is viewed from above as shown in FIG. 1) to the surface area of one side of the graphite film. When the hole area ratio of the graphite film is 1.4% or more, the through-hole part metal area ratio of the graphite composite film can also be set to 1.4% or more, which makes it possible to properly suppress delamination between the graphite film and the metal layer. Further, when the hole area ratio of the graphite film is 40.0% or less, the graphite film can maintain high heat dissipation performance.

(Through Hole Diameter)

The diameter of the through holes is not particularly limited, but is preferably 0.90 mm or less, more preferably 0.50 mm or less, even more preferably 0.20 mm or less, most preferably 0.10 mm or less. When a heat source is placed on the surface of the graphite composite film according to the present invention, the temperature of the graphite film is increased locally around the through holes. However, the graphite composite film according to the present invention can have a more uniform temperature distribution as a whole when the through hole diameter is 0.90 mm or less.

Figure 2:
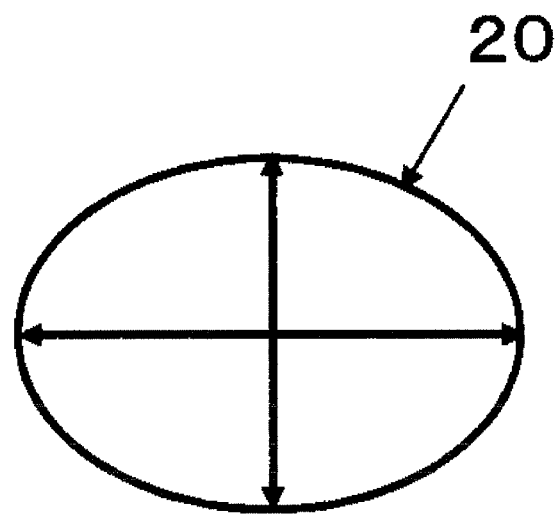
FIG. 2 shows one example of through holes formed in a graphite film in the present invention.

FIG. 2 is a top view of one example of the through holes formed in the graphite film in the present invention. Referring to FIG. 2, the through hole diameter herein refers to the average of the length of a line segment between outer ends on a straight line passing through the center of the through hole 20 and the outermost ends of the through hole 20 and the length of a line segment between outer ends on a straight line orthogonal to the above straight line.

(Metal Layer Formed Inside Through Holes)

The metal layer inside the through holes may be formed inside all the through holes or may be formed inside only some of the through holes. Further, the through holes may be completely blocked with the metal layer or may be partially blocked with the metal layer as shown in FIG. 1. For example, when it is desired that flexibility is also imparted to the graphite composite film, some of the through holes may be left without forming a metal layer inside thereof in part of the graphite composite film or through holes partially blocked with a metal layer may be formed.

(Thickness of Metal Layer)

The thickness of the metal layer is not particularly limited, but the metal layer located on the side where a heat source is to be placed preferably has a thickness of 50 μm or less, more preferably 30 μm or less, even more preferably 20 μm or less. When the metal layer located on the heat source side has a thickness of 50 μm or less, heat from the heat source can more quickly be transferred to the graphite film, and therefore the graphite film can deliver high heat dissipation performance.

(Type of Metal)

The type of metal constituting the metal layer is not particularly limited, and examples of the metal include copper, nickel, gold, silver, tin, chromium, zinc, and palladium. Particularly, copper has high heat conductivity and copper plating can be easily performed. Therefore, copper is preferably used as a material of the metal layer formed on the surface of the graphite film.

(Method for Forming Metal Layer)

A method for forming the metal layer is not particularly limited, and the metal layer can be formed by vapor deposition, CVD, or plating. However, the graphite film itself is electrically conductive and therefore can be subjected to electrolytic plating without performing electroless plating. For this reason, the metal layer is preferably formed by plating. In the case of electrolytic plating, a metal layer is directly deposited on the surface of the graphite film, and therefore void formation or separation is less likely to occur between the graphite film and the metal layer so that excellent heat transfer is achieved between the graphite film and the metal layer due to an excellent contact between them. Further, plating is suitable for forming a metal layer inside the through holes of the graphite film because a metal layer can grow also from the inner surfaces of the through holes. Particularly, a plating solution having low viscosity is preferred, because such a plating solution can easily enter into the through holes. Further, in the case of plating, the thickness of the metal layer can be easily controlled. Particularly, a thin metal layer can be easily formed even when the thickness of the metal layer on one side of the graphite film is as small as 20 μm or less. This also makes it possible to achieve a composite structure utilizing the lightweight properties and high heat dissipation performance of the graphite film.

(Type of Graphite Film)

The graphite film used in the present invention is not particularly limited, and may be a graphite film obtained by subjecting a polymer film to heat treatment or a graphite film obtained by expanding natural graphite as a raw material. The graphite film obtained by subjecting a polymer film to heat treatment offers high heat dissipation performance, but has low surface activity due to a highly crystalline structure of graphite and is therefore difficult to combine with another material. Therefore, by adopting the configuration of the present invention, it is possible to obtain a graphite composite film excellent in both heat dissipation performance and surface activity.

A first method for producing the graphite film used in the present invention is one in which natural graphite as a raw material is expanded to obtain a graphite film. More specifically, natural graphite is immersed in an acid such as sulfuric acid to produce a graphite intercalation compound, and the graphite intercalation compound is subjected to heat treatment and expanded to separate the layers of graphite from each other. After the separation, the graphite powder is washed to remove the acid to obtain a thin film-like graphite powder. The thus obtained graphite powder is further rolled to obtain a graphite film.

A second graphite film production method preferably used in the present invention is one in which a polymer film made of a polyimide resin or the like is subjected to heat treatment to produce a graphite film.

In order to obtain a graphite film from a polymer film, a polymer film as a start material is first carbonized by preheating the polymer film to a temperature of about 1000° C. under reduced pressure or in an inert gas to obtain a carbonized film. Then, the carbonized film is graphitized by heating the carbonized film to a temperature of 2800° C. or higher in an inert gas atmosphere so that a highly crystalline structure of graphite is formed. In this way, a graphite film excellent in heat conductivity can be obtained.

(Shape of Graphite Film)

The graphite film used in the present invention has through holes previously formed therein before forming a metal layer. The graphite film used to obtain the graphite composite film according to the present invention preferably has a distance between outer diameters of through holes of 0.6 mm or less and a hole area ratio of 1.4% or more.

(Applications)

The graphite composite film according to the present invention has excellent heat conductivity and therefore can be used in various heat-related applications. For example, the graphite composite film can be used as a heat dissipation film for use in substrates such as substrates with built-in components and substrates for LED or power semiconductor devices.

EXAMPLES

Graphite Film

One equivalent of pyromellitic dianhydride was dissolved in a DMF (dimethylformamide) solution, in which one equivalent of 4,4'-oxydianiline was dissolved, to obtain a polyamic acid solution (18.5 wt %). Then, an imidization catalyst containing one equivalent of acetic anhydride and one equivalent of isoquinoline relative to carboxylic groups contained in polyamic acid and DMF was added to the polyamic acid solution for defoaming while the polyamic acid solution was cooled. Then, the mixed solution was applied onto an aluminum foil so that a predetermined thickness (75 μm) was achieved after drying. The mixed solution layer on the aluminum foil was dried using a hot-air oven and far-infrared heater. In this way, a polyimide film having a thickness of 75 μm was prepared.

The thus prepared polyimide film was sandwiched between graphite plates, placed in an electric furnace, and subjected to carbonization treatment by increasing the temperature in the electric furnace to 1400° C. at 1° C./min to obtain a carbonized film. The carbonized film obtained by the carbonization treatment was sandwiched between graphite plates, placed in a graphitization furnace, subjected to graphitization treatment by increasing the temperature in the graphitization furnace to 2900° C. at a temperature rise rate of 1° C./min, and then subjected to compression processing by single-plate press at a pressure of 20 MPa to obtain a graphite film (thickness: 40 μm). In the following Examples 1 to 23 and Comparative Examples 2 to 10, this graphite film was used.

(Evaluations)

<Evaluation of Heat Dissipation Performance>

Figure 3:
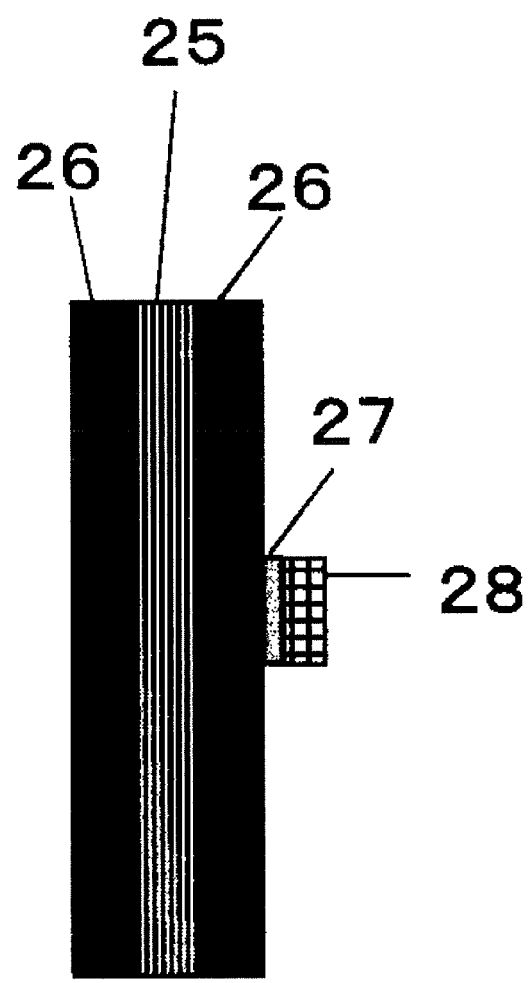
FIG. 3 shows a structure including a sample, which is used in a heat dissipation test.

FIG. 3 is a sectional view showing a structure including a sample used for evaluating heat dissipation performance. Referring to Tables 1 to 7, the sample refers to a graphite film (GS), a metal foil, or a graphite film having a metal layer formed thereon (graphite composite film). A PET tape 26 having a thickness of 30 μm (GL-30B manufactured by Nichiei Kako Co., Ltd.) was bonded to both sides of a sample 25 using a laminator. Then, a black body with an emissivity of 0.94 was sprayed onto both sides of the sample having the PET tape bonded thereto. A heating element 28 was placed at the center of the PCT tape on the surface of the sample with a gel sheet 27 (high heat conductive gray lambda•gel sheet 6.5 W/mK manufactured by GELTEC CO., LTD.) being interposed between the heating element 28 and the PCT tape.

The heating element 28 had a size of 10 mm×10 mm and a thickness of 1 mm, and its power consumption was 1.5 W. The sample had a size of 50 mm×50 mm.

The center temperature (° C.) of the heating element was measured in an atmosphere of 23° C. by thermal image analysis after a lapse of 1000 seconds from the start of heat generation (i.e., when the heating element reached a steady state).

The heat dissipation performance of the sample was evaluated according to the following criteria:

A: the center temperature of the heating element 28 was 62.9° C. or lower;
B: the center temperature of the heating element 28 was 63.0° C. to 65.4° C.;
C: the center temperature of the heating element 28 was 65.5° C. to 66.5° C.; and
D: the center temperature of the heating element 28 was 66.6° C. or higher.

<Evaluation of Soldering Heat Resistance>

1) Evaluation of Soldering Heat Resistance of Sample Only

A test piece of 50 mm×50 mm was cut out from a graphite composite film as a sample and immersed in a solder bath at 260° C. for 10 seconds to evaluate soldering heat resistance.

The soldering heat resistance of the sample was evaluated according to the following criteria:

A: the distance from the end of delamination between the metal layer and the graphite film was 0.20 mm or less;
B: the distance from the end of delamination between the metal layer and the graphite film was 0.21 mm to 0.40 mm;
C: the distance from the end of delamination between the metal layer and the graphite film was 0.41 mm to 0.60 mm; and
D: the distance from the end of delamination between the metal layer and the graphite film was 0.61 mm or more.

2) Evaluation of Soldering Heat Resistance of Sample Combined with Epoxy Resin

A layer made of an epoxy resin (D3451 manufactured by Sony Chemicals Corporation) was laminated on both sides of the sample, a polyimide film (APICAL 50AH manufactured by KANEKA CORPORATION) was further laminated on the epoxy resin layer, and they are bonded together by hot press under conditions of 160° C., 3 MPa, and 60 minutes to obtain a laminated body. A test piece of 50 mm×50 mm was cut out from the laminated body and immersed in a solder bath at 260° C. for 10 seconds to evaluate soldering heat resistance.

The soldering heat resistance of the sample combined with epoxy resin was evaluated according to the following criteria:

A: delamination or separation did not occur between the epoxy resin layer and the sample; and
B: delamination or separation occurred between the epoxy resin layer and the sample.

<Holding Strength Between Metal Layer and Graphite Film (Peel Test)>

Figure 4:
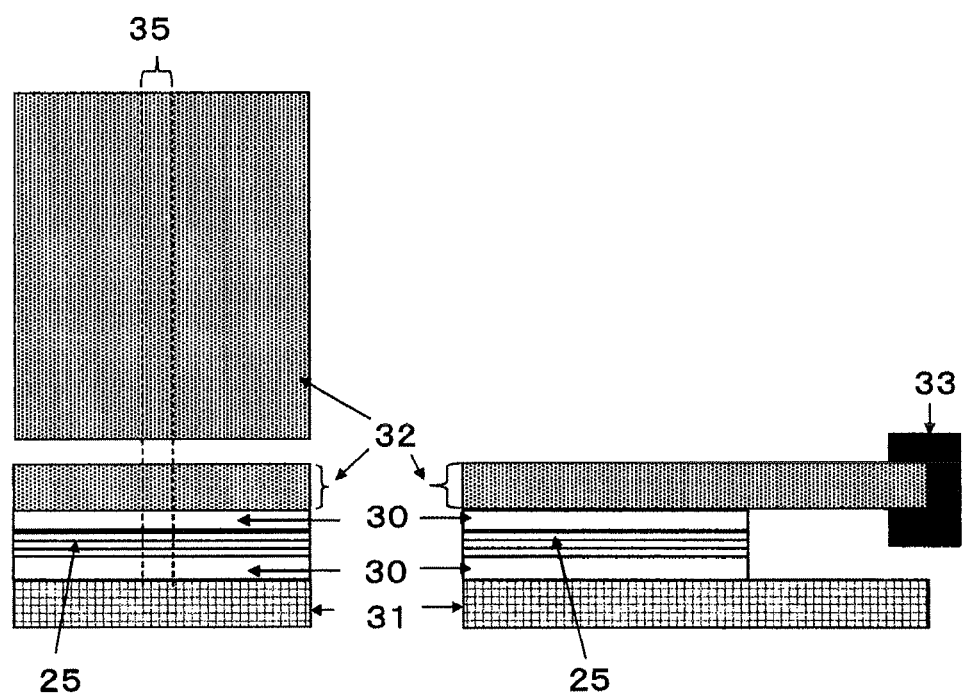
FIG. 4 shows a structure including a sample, which is used in a peel test.

Referring to FIG. 4, a laminated body was prepared which was composed of a graphite composite film as a sample 25 (30 mm×60 mm), a bonding sheet 30 (AY-25KA manufactured by Arisawa Mfg. Co., Ltd., 30 mm×60 mm), a glass/epoxy plate 31 (thickness: 1 mm, 30 mm×100 mm), and a polyimide film/copper foil-laminated film 32 (R-F770 manufactured by Panasonic Electric Works Co., Ltd., 30 mm×100 mm). Then, the laminated body other than the glass/epoxy plate was cut along dotted lines 35 shown in FIG. 4 to have a width of 3 mm. The polyimide film/copper foil-laminated film 32 was pinched by a chuck 33 of a peel test machine to perform a peel test under conditions of an angle of 90° and a peel rate of 200 mm/sec. It is to be noted that in FIG. 4, a lower left-hand sectional view is a sectional view of the laminated body viewed from its short side direction and a lower right-hand sectional view is a sectional view of the laminated body viewed from its longitudinal direction.

The holding strength was evaluated according to the following criteria:

A: delamination occurred between the metal layer and the bonding sheet (resin-metal);
B: delamination occurred inside the graphite film (GS-GS); and
C: delamination occurred between the metal layer and the graphite film (metal-GS).

(Copper Plating Method)

The graphite film was immersed in a solution of Melplate PC-316 with a concentration of 100 mL/L at a temperature of 45° C. for 1 minute and then washed with water to perform degreasing treatment.

Then, the graphite film was subjected to electrolytic copper plating in a solution containing copper (II) sulfate pentahydrate (100 g/L), 98% sulfuric acid (190 g/L), NaCl (50 mg/L), and COPPER GLEAM ST-901C (5 mL/L) under conditions of room temperature and 2 A/dm$^2$ and was then washed with water.

Finally, the graphite film was immersed in a solution containing AT7130 (25 mL/L) and 98% sulfuric acid (30 mL/L) at room temperature for 1 minute, washed with water, and dried to perform rust-proofing treatment.

Example 1

Through holes having a diameter of 0.20 mm were formed by NC drilling in the entire surface of the graphite film so that the pitch between the through holes (i.e., the distance between centers of the through holes adjacent to each other) was 0.50 mm (distance between outer diameters of through holes: 0.30 mm, hole area ratio: 12.6%). Then, the graphite film was subjected to copper plating to form a copper layer on both sides of the graphite film and inside the through holes. The thickness of plating on both sides was 20 μm (thickness of plating on one side: 10 μm). In this way, a graphite composite film having a through-hole part copper area ratio of 2.4% and a thickness of 60 μm was formed. The results are shown in Table 1.

Comparative Example 1

A copper foil having a thickness of 60 μm was used. The results are shown in Table 1.

Comparative Example 2

The graphite film having a thickness of 40 μm was used. The results are shown in Table 1.

Comparative Example 3

The graphite film having no through holes was subjected to copper plating to form a copper layer on both sides of the graphite film. The thickness of plating on both sides was 20 μm (thickness of plating on one side: 10 μm). In this way, a graphite composite film having a through-hole part copper area ratio of 0% and a thickness of 60 μm was formed. The results are shown in Table 1.

Comparative Example 4

A graphite composite film having a through-hole part copper area ratio of 0% and a thickness of 80 μm was formed in the same manner as in Comparative Example 3 except that the thickness of plating on both sides was 40 μm (thickness of plating on one side: 20 μm). The results are shown in Table 1.

Comparative Example 5

A graphite composite film having a through-hole part copper area ratio of 0% and a thickness of 120 μm was formed in the same manner as in Comparative Example 3 except that the thickness of plating on both sides was 80 μm (thickness of plating on one side: 40 μm). The results are shown in Table 1.

TABLE 1

| | | Sample preparation conditions | | | | | | |
| --- | --- | --- | --- | --- | --- | --- | --- | --- |
| | | | GS | | | | | Copper layer |
| | Sample | Total thickness/ μm | Thickness/ μm | Through hole diameter/mm | Pitch between through holes/mm | Distance between outer diameters of through holes/mm | Hole area ratio/% | Thickness (both sides)/μm |
| Comparative Example 1 | Copper foil | 60 | — | — | — | — | — | 60 |
| Comparative Example 2 | GS | 40 | 40 | — | — | — | — | — |
| Comparative Example 3 | Copper-plated GS | 60 | 40 | — | — | — | — | 20 |
| Comparative Example 4 | | 80 | 40 | — | — | — | — | 40 |
| Comparative Example 5 | | 120 | 40 | — | — | — | — | 80 |
| Example 1 | | 60 | 40 | 0.20 | 0.50 | 0.30 | 12.6 | 20 |

| | Sample preparation conditions Copper layer | | Evaluation results | | | | | |
| --- | --- | --- | --- | --- | --- | --- | --- | --- |
| | | | Holding | | Soldering heat resistance | | Heat dissipation performance | |
| | Through-hole part copper area ratio/% | Degree of blockage in through holes | strength (peel test) Delamination site | Evaluation | Sample only | Sample combined with epoxy resin | Evaluation | Center temperature of heating element/° C. |
| Comparative Example 1 | — | — | — | — | — | A | D | 66.6 |
| Comparative Example 2 | — | — | — | — | — | B | A | 62.9 |
| Comparative Example 3 | — | — | Metal layer-GS | C | D | — | — | — |
| Comparative Example 4 | — | — | Metal layer-GS | C | D | — | — | — |
| Comparative Example 5 | — | — | Metal layer-GS | C | D | — | — | — |
| Example 1 | 2.4 | Partially blocked | GS-GS | B | B | A | B | 63.1 |

The copper foil of Comparative Example 1 had excellent soldering heat resistance even when combined with epoxy resin, but was inferior to the graphite film in heat dissipation performance. More specifically, in spite of the fact that the copper foil had a thickness of 60 μm, the copper foil was much inferior to the graphite film having a thickness of 40 μm in heat dissipation performance. This indicates that the copper foil of Comparative Example 1 is slightly inadequate as a heat dissipation material for high-heat-generating electronic parts. On the other hand, the graphite film of Comparative Example 2 offered higher heat dissipation performance than the copper foil of Comparative Example 1, but was poor in soldering heat resistance when combined with epoxy resin so that delamination occurred between the epoxy resin layer and the graphite film. This indicates that it is difficult to combine the graphite film of Comparative Example 2 with another material.

In Comparative Examples 3 to 5, the graphite film was combined with copper by copper plating. However, since the graphite film was not subjected to treatment such as surface treatment, a copper layer was once formed on the surface of the graphite film but was soon peeled off by a slight impact or the like. Therefore, the copper layer was completely peeled off from the graphite film in the soldering heat resistance test and the peel test. Further, an attempt was made to combine the copper-plated graphite film with epoxy resin to perform the soldering heat resistance test, but the copper layer was peeled off in the course of sample preparation, and therefore the test could not even be performed. In this case, holding strength between the copper layer and the graphite film was not improved even when the thickness of plating was changed (Comparative Examples 3 to 5).

On the other hand, in Example 1, since the graphite film was subjected to plating after a plurality of through holes were formed therein, the graphite film could be properly plated with copper. The copper-plated graphite film of Example 1 was comparable in heat dissipation performance to the graphite film and could be properly bonded to epoxy resin.

Example 2

Through holes having a diameter of 0.40 mm were formed by NC drilling in the graphite film so that the pitch between the through holes was 1.00 mm (distance between outer diameters of through holes: 0.60 mm, hole area ratio: 12.6%). Then, the graphite film was subjected to copper plating to form a copper layer on both sides of the graphite film and inside the through holes. The thickness of plating on both sides was 80 μm (thickness of plating on one side: 40 μm). In this way, a graphite composite film having a through-hole part copper area ratio of 4.5% and a thickness of 120 μm was formed. The results are shown in Table 2.

Example 3

Through holes having a diameter of 0.20 mm were formed by NC drilling in the graphite film so that the pitch between the through holes was 0.50 mm (distance between outer diameters of through holes: 0.30 mm, hole area ratio: 12.6%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 4.5% and a thickness of 80 μm was formed. The results are shown in Table 2.

Example 4

Through holes having a diameter of 0.20 mm were formed by NC drilling in the graphite film so that the pitch between the through holes was 0.37 mm (distance between outer diameters of through holes: 0.17 mm, hole area ratio: 22.9%). Then, the graphite film was subjected to copper plating to form a copper layer on both sides of the graphite film and inside the through holes. The thickness of plating on both sides was 20 μm (thickness of plating on one side: 10 μm). In this way, a graphite composite film having a through-hole part copper area ratio of 4.4% and a thickness of 60 μm was formed. The results are shown in Table 2.

Example 5

Through holes having a diameter of 0.04 mm were formed by laser processing in the graphite film so that the pitch between the through holes was 0.17 mm (distance between outer diameters of through holes: 0.13 mm, hole area ratio: 4.3%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 4.3% and a thickness of 80 μm was formed. The results are shown in Table 2.

Comparative Example 6

Through holes having a diameter of 0.20 mm were formed by NC drilling in the graphite film so that the pitch between the through holes was 1.00 mm (distance between outer diameters of through holes: 0.80 mm, hole area ratio: 3.1%). Then, the graphite film was subjected to copper plating to form a copper layer on both sides of the graphite film and inside the through holes. The thickness of plating on both sides was 20 μm (thickness of plating on one side: 10 μm). In this way, a graphite composite film having a through-hole part copper area ratio of 0.6% and a thickness of 60 μm was formed. The results are shown in Table 2.

Comparative Example 7

Through holes having a diameter of 0.04 mm were formed by laser processing in the graphite film so that the pitch between the through holes was 0.80 mm (distance between outer diameters of through holes: 0.76 mm, hole area ratio: 0.2%). Then, the graphite film was subjected to copper plating to form a copper layer on both sides of the graphite film and inside the through holes. The thickness of plating on both sides was 20 μm (thickness of plating on one side: 10 μm). In this way, a graphite composite film having a through-hole part copper area ratio of 0.1% and a thickness of 60 μm was formed. The results are shown in Table 2.

TABLE 2

| | Sample | Sample preparation conditions | | | | | | |
|---|---|---|---|---|---|---|---|---|
| | | | GS | | | | | Copper layer |
| | | Total thickness/ μm | Thickness/ μm | Through hole diameter/mm | Pitch between through holes/mm | Distance between outer diameters of through holes/mm | Hole area ratio/% | Thickness (both sides)/μm |
| Comparative Example 3 | Copper-plated | 60 | 40 | — | — | — | — | 20 |
| Comparative Example 6 | GS | 60 | 40 | 0.20 | 1.00 | 0.80 | 3.1 | 20 |
| Comparative Example 7 | | 60 | 40 | 0.04 | 0.80 | 0.76 | 0.2 | 20 |
| Example 2 | | 120 | 40 | 0.40 | 1.00 | 0.60 | 12.6 | 80 |
| Example 3 | | 80 | 40 | 0.20 | 0.50 | 0.30 | 12.6 | 40 |
| Example 4 | | 60 | 40 | 0.20 | 0.37 | 0.17 | 22.9 | 20 |
| Example 5 | | 80 | 40 | 0.04 | 0.17 | 0.13 | 4.3 | 40 |

| | Sample preparation conditions Copper layer | | Evaluation results | | | | | |
|---|---|---|---|---|---|---|---|---|
| | | | Holding | | Soldering heat resistance | | Heat dissipation performance | |
| | Through-hole part copper area ratio/% | Degree of blockage in through holes | strength (peel test) Delamination site | Evaluation | Sample only | Sample combined with epoxy resin | Evaluation | Center temperature of heating element/° C. |
| Comparative Example 3 | — | — | Metal layer-GS | C | D | — | — | — |
| Comparative Example 6 | 0.6 | Partially blocked | Metal layer-GS | C | D | A | A | 62.0 |
| Comparative Example 7 | 0.1 | Partially blocked | Metal layer-GS | C | D | A | A | 61.7 |
| Example 2 | 4.5 | Partially blocked | Resin-metal layer | A | C | A | A | 59.5 |
| Example 3 | 4.5 | Partially blocked | Resin-metal layer | A | B | A | A | 61.2 |
| Example 4 | 4.4 | Partially blocked | Resin-metal layer | A | A | A | B | 63.9 |
| Example 5 | 4.3 | Completely blocked | Resin-metal layer | A | A | A | A | 59.9 |

As can be seen from the results shown in FIG. 2, soldering heat resistance tends to improve when the distance between outer diameters of the through holes is 0.60 mm or less. Example 2 and Example 3 were different in the through hole diameter, the distance between outer diameters of through holes, and the plating thickness but the same in the hole area ratio and the through-hole part copper area ratio. In this case, Example 3 was superior in soldering heat resistance. On the other hand, Example 3 and Example 4 were different in the distance between outer diameters of through holes, the plating thickness, and the hole area ratio but the same in the through hole diameter and the through-hole part copper area ratio. In this case, Examples 4 was superior in soldering heat resistance. Further, Example 3 and Example 5 were different in the through hole diameter, the distance between outer diameters of through holes, and the hole area ratio but the same in the plating thickness and the through-hole part copper area ratio. In this case, Example 5 was superior in soldering heat resistance. That is, as can be seen from the comparison of Examples 2 to 5, soldering heat resistance depends on the distance between outer diameters of through holes and is higher when the distance between outer diameters of through holes is smaller. Further, as can be seen from the results of Comparative Examples 6 and 7, when the distance between outer diameters of through holes is as large as 0.80 mm or 0.76 mm, plating is peeled off under high temperature conditions due to the difference in linear expansivity between copper and the graphite film.

Comparative Example 8

Through holes having a diameter of 0.20 mm were formed by NC drilling in the graphite film so that the pitch between the through holes was 0.50 mm (distance between outer diameters of through holes: 0.30 mm, hole area ratio: 12.6%). Then, the graphite film was subjected to copper plating to form a copper layer on both sides of the graphite film and inside the through holes. The thickness of plating on both sides was 10 μm (thickness of plating on one side: 5 μm). In this way, a graphite composite film having a through-hole part copper area ratio of 1.2% and a thickness of 50 μm was formed. The results are shown in Table 3.

Example 6

Through holes having a diameter of 0.04 mm were formed by laser processing in the graphite film so that the pitch between the through holes was 0.15 mm (distance between outer diameters of through holes: 0.11 mm, hole area ratio: 5.6%). Then, the graphite film was subjected to copper plating to form a copper layer on both sides of the graphite film and inside the through holes. The thickness of plating on both sides was 10 μm (thickness of plating on one side: 5

μm). In this way, a graphite composite film having a through-hole part copper area ratio of 2.4% and a thickness of 50 μm was formed. The results are shown in Table 3.

Example 7

Through holes having a diameter of 0.04 mm were formed by laser processing in the graphite film so that the pitch between the through holes was 0.15 mm (distance between outer diameters of through holes: 0.11 mm, hole area ratio: 5.6%). Then, the graphite film was subjected to copper plating to form a copper layer on both sides of the graphite film and inside the through holes. The thickness of plating on both sides was 20 μm (thickness of plating on one side: 10 μm). In this way, a graphite composite film having a through-hole part copper area ratio of 4.2% and a thickness of 60 μm was formed. The results are shown in Table 3.

Example 8

Through holes having a diameter of 0.04 mm were formed by laser processing in the graphite film so that the pitch between the through holes was 0.15 mm (distance between outer diameters of through holes: 0.11 mm, hole area ratio: 5.6%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 5.6% and a thickness of 80 μm was formed. The results are shown in Table 3.

Comparative Example 8, Example 1, and Example 3 were the same in the through hole diameter, the distance between outer diameters of through holes, and the hole area ratio, but were made different in the through-hole part copper area ratio by changing the plating thickness. As a result, when the through-hole part copper area ratio was increased to 2.4% as in Example 1, delamination between the plating and the graphite film did not occur, but delamination inside the graphite film occurred. That is, it can be said that the holding strength between the plating and the graphite film became greater than the interlaminar strength of the graphite film. Further, when the through-hole part copper area ratio was increased to 4.5% as in Example 3, strength between the plating and the graphite film was improved and, in addition, delamination inside the graphite film could also be suppressed, that is, the graphite composite film obtained in Example 3 had high interlaminar strength.

Examples 6 to 8 had a through hole diameter as small as 0.04 mm and, as in the case of Comparative Example 8 and Examples 1 and 3, were made different in the through-hole part copper area ratio by changing only the plating thickness. Also when the through hole diameter was made small, the same tendency as Comparative Example 8 and Examples 1 and 3 was observed. That is, when the through-hole part copper area ratio was 4.2% as in Example 7, both peeling-off of the plating and delamination inside the graphite film could be suppressed. Further, Examples 6 to 8 had a distance between outer diameters of through holes of 0.11 mm that was smaller than that of Comparative Example 8 and Examples 1 and 3, and were therefore improved also in soldering heat resistance.

TABLE 3

| | | Sample preparation conditions | | | | | | |
|---|---|---|---|---|---|---|---|---|
| | | | GS | | | | | Copper layer |
| | Sample | Total thickness/ μm | Thickness/ μm | Through hole diameter/mm | Pitch between through holes/mm | Distance between outer diameters of through holes/mm | Hole area ratio/% | Thickness (both sides)/μm |
| Comparative Example 8 | Copper-plated GS | 50 | 40 | 0.20 | 0.50 | 0.30 | 12.6 | 10 |
| Example 1 | | 60 | 40 | 0.20 | 0.50 | 0.30 | 12.6 | 20 |
| Example 3 | | 80 | 40 | 0.20 | 0.50 | 0.30 | 12.6 | 40 |
| Example 6 | | 50 | 40 | 0.04 | 0.15 | 0.11 | 5.6 | 10 |
| Example 7 | | 60 | 40 | 0.04 | 0.15 | 0.11 | 5.6 | 20 |
| Example 8 | | 80 | 40 | 0.04 | 0.15 | 0.11 | 5.6 | 40 |

| | Sample preparation conditions Copper layer | | Evaluation results | | | | | |
|---|---|---|---|---|---|---|---|---|
| | | | Holding strength (peel test) | | Soldering heat resistance | | Heat dissipation performance | |
| | Through-hole part copper area ratio/% | Degree of blockage in through holes | Delamination site | Evaluation | Sample only | Sample combined with epoxy resin | Evaluation | Center temperature of heating element/° C. |
| Comparative Example 8 | 1.2 | Partially blocked | Metal layer-GS | C | B | A | B | 63.5 |
| Example 1 | 2.4 | Partially blocked | GS-GS | B | B | A | B | 63.1 |
| Example 3 | 4.5 | Partially blocked | Resin-metal layer | A | B | A | A | 61.2 |
| Example 6 | 2.4 | Partially blocked | GS-GS | B | A | A | B | 63.0 |
| Example 7 | 4.2 | Partially blocked | Resin-metal layer | A | A | A | A | 62.3 |
| Example 8 | 5.6 | Completely blocked | Resin-metal layer | A | A | A | A | 60.1 |

Example 9

Through holes having a diameter of 0.04 mm were formed by laser processing in the graphite film so that the pitch between the through holes was 0.30 mm (distance between outer diameters of through holes: 0.26 mm, hole area ratio: 1.4%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 1.4% and a thickness of 80 μm was formed. The results are shown in Table 4.

Example 10

Through holes having a diameter of 0.04 mm were formed by laser processing in the graphite film so that the pitch between the through holes was 0.20 mm (distance between outer diameters of through holes: 0.16 mm, hole area ratio: 3.1%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 3.1% and a thickness of 80 μm was formed. The results are shown in Table 4.

Example 11

Through holes having a diameter of 0.04 mm were formed by laser processing in the graphite film so that the pitch between the through holes was 0.10 mm (distance between outer diameters of through holes: 0.06 mm, hole area ratio: 12.6%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 12.6% and a thickness of 80 μm was formed. The results are shown in Table 4.

Example 12

Through holes having a diameter of 0.03 mm were formed by laser processing in the graphite film so that the pitch between the through holes was 0.10 mm (distance between outer diameters of through holes: 0.07 mm, hole area ratio: 7.1%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 7.1% and a thickness of 80 μm was formed. The results are shown in Table 4.

Example 13

Through holes having a diameter of 0.05 mm were formed by laser processing in the graphite film so that the pitch between the through holes was 0.20 mm (distance between outer diameters of through holes: 0.15 mm, hole area ratio: 4.9%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 4.7% and a thickness of 80 μm was formed. The results are shown in Table 4.

Example 14

Through holes having a diameter of 0.20 mm were formed by NC drilling in the graphite film so that the pitch between the through holes was 0.70 mm (distance between outer diameters of through holes: 0.50 mm, hole area ratio: 6.4%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 2.3% and a thickness of 80 μm was formed. The results are shown in Table 4.

Example 15

Through holes having a diameter of 0.20 mm were formed by NC drilling in the graphite film so that the pitch between the through holes was 0.40 mm (distance between outer diameters of through holes: 0.20 mm, hole area ratio: 19.6%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 7.1% and a thickness of 80 μm was formed. The results are shown in Table 4.

Example 16

Through holes having a diameter of 0.50 mm were formed by NC drilling in the graphite film so that the pitch between the through holes was 1.00 mm (distance between outer diameters of through holes: 0.50 mm, hole area ratio: 19.6%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 19.6% and a thickness of 80 μm was formed. The results are shown in Table 4.

Example 17

Through holes having a diameter of 0.50 mm were formed by NC drilling in the graphite film so that the pitch between the through holes was 0.70 mm (distance between outer diameters of through holes: 0.20 mm, hole area ratio: 40.1%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 40.1% and a thickness of 80 μm was formed. The results are shown in Table 4.

Example 18

Through holes having a diameter of 1.00 mm were formed by NC drilling in the graphite film so that the pitch between the through holes was 1.20 mm (distance between outer diameters of through holes: 0.20 mm, hole area ratio: 54.5%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 54.5% and a thickness of 80 μm was formed. The results are shown in Table 4.

Comparative Example 9

Through holes having a diameter of 1.00 mm were formed by NC drilling in the graphite film so that the pitch between the through holes was 2.00 mm (distance between outer diameters of through holes: 1.00 mm, hole area ratio: 19.6%). Then, the graphite film was subjected to copper plating to form a copper layer on both sides of the graphite film and inside the through holes. The thickness of plating on both sides was 40 μm (thickness of plating on one side: 20 μm). In this way, a graphite composite film having a through-hole part copper area ratio of 19.6% and a thickness of 80 μm was formed. The results are shown in Table 4.

or separation of the copper layer did not occur and excellent results were obtained. Further, the through-hole part copper area ratio was increased by reducing the pitch between through holes, and therefore Example 8 having a through-hole part copper area ratio of 5.6% and Example 11 having a through-hole part copper area ratio of 12.6% showed excellent results also in the peel test. As can be seen from this, when the through hole diameter or the plating thickness is not changed, both soldering heat resistance and peel strength can be improved by reducing the pitch between through holes. It is to be noted that Examples 8 and 11 were the same in soldering heat resistance and peel strength, but

TABLE 4

| | | Sample preparation conditions | | | | | |
|---|---|---|---|---|---|---|---|
| | | | GS | | | | Copper layer |
| | Sample | Total thickness/ μm | Thickness/ μm | Through hole diameter/mm | Pitch between through holes/mm | Distance between outer diameters of through holes/mm | Hole area ratio/% | Thickness (both sides)/μm |
| Example 9 | Copper- | 80 | 40 | 0.04 | 0.30 | 0.26 | 1.4 | 40 |
| Example 10 | plated | 80 | 40 | 0.04 | 0.20 | 0.16 | 3.1 | 40 |
| Example 8 | GS | 80 | 40 | 0.04 | 0.15 | 0.11 | 5.6 | 40 |
| Example 11 | | 80 | 40 | 0.04 | 0.10 | 0.06 | 12.6 | 40 |
| Example 12 | | 80 | 40 | 0.03 | 0.10 | 0.07 | 7.1 | 40 |
| Example 13 | | 80 | 40 | 0.05 | 0.20 | 0.15 | 4.9 | 40 |
| Example 14 | | 80 | 40 | 0.20 | 0.70 | 0.50 | 6.4 | 40 |
| Example 15 | | 80 | 40 | 0.20 | 0.40 | 0.20 | 19.6 | 40 |
| Example 16 | | 80 | 40 | 0.50 | 1.00 | 0.50 | 19.6 | 40 |
| Example 17 | | 80 | 40 | 0.50 | 0.70 | 0.20 | 40.1 | 40 |
| Example 18 | | 80 | 40 | 1.00 | 1.20 | 0.20 | 54.5 | 40 |
| Comparative Example 9 | | 80 | 40 | 1.00 | 2.00 | 1.00 | 19.6 | 40 |

| | Sample preparation conditions Copper layer | | Evaluation results | | | | | |
|---|---|---|---|---|---|---|---|---|
| | | | | Holding strength (peel test) | | Soldering heat resistance | | Heat dissipation performance |
| | Through-hole part copper area ratio/% | Degree of blockage in through holes | Delamination site | Evaluation | Sample only | Sample combined with epoxy resin | Evaluation | Center temperature of heating element/° C. |
| Example 9 | 1.4 | Completely blocked | GS-GS | B | B | A | A | 59.6 |
| Example 10 | 3.1 | Completely blocked | GS-GS | B | A | A | A | 59.8 |
| Example 8 | 5.6 | Completely blocked | Resin-metal layer | A | A | A | A | 60.1 |
| Example 11 | 12.6 | Completely blocked | Resin-metal layer | A | A | A | A | 61.2 |
| Example 12 | 7.1 | Completely blocked | Resin-metal layer | A | A | A | A | 60.5 |
| Example 13 | 4.7 | Partially blocked | Resin-metal layer | A | A | A | A | 59.9 |
| Example 14 | 2.3 | Partially blocked | GS-GS | B | C | A | A | 59.7 |
| Example 15 | 7.1 | Partially blocked | Resin-metal layer | A | A | A | A | 62.5 |
| Example 16 | 19.6 | Completely blocked | Resin-metal layer | A | C | A | A | 62.5 |
| Example 17 | 40.1 | Completely blocked | Resin-metal layer | A | A | A | B | 64.9 |
| Example 18 | 54.5 | Completely blocked | Resin-metal layer | A | A | A | C | 65.5 |
| Comparative Example 9 | 19.6 | Completely blocked | Resin-metal layer | A | D | A | A | 62.5 |

Examples 8 to 11 had the same through hole diameter of 0.04 mm but were made different in the pitch between through holes. As a result, in the soldering heat resistance test of Examples 8 and 10 having a distance between outer diameters of through holes of 0.16 mm or less, peeling-off Example 8 was superior in heat dissipation performance. As can be seen from this, the hole area ratio of the graphite film is preferably set to be low from the viewpoint of heat dissipation performance.

When the distance between outer diameters of through holes is reduced to 0.20 mm or less by increasing the through hole diameter as in Examples 15, 17, and 18, the hole area ratio of the graphite film is increased so that heat dissipation performance is deteriorated. As can be seen from this, the through hole diameter of the graphite film is preferably set to be small.

Example 19

Through holes having a diameter of 0.04 mm were formed by laser processing in the graphite film so that the pitch between the through holes was 0.20 mm (distance between outer diameters of through holes: 0.16 mm, hole area ratio: 3.1%). Then, the graphite film was subjected to copper plating to form a copper layer on both sides of the graphite film and inside the through holes. The thickness of plating on both sides was 20 μm (thickness of plating on one side: 10 μm). In this way, a graphite composite film having a through-hole part copper area ratio of 2.4% and a thickness of 60 μm was formed. The results are shown in Table 5.

Example 20

Through holes having a diameter of 0.04 mm were formed by laser processing in the graphite film so that the pitch between the through holes was 0.10 mm (distance between outer diameters of through holes: 0.06 mm, hole area ratio: 12.6%). Then, the graphite film was subjected to copper plating to form a copper layer on both sides of the graphite film and inside the through holes. The thickness of plating on both sides was 20 μm (thickness of plating on one side: 10 μm). In this way, a graphite composite film having a through-hole part copper area ratio of 9.4% and a thickness of 60 μm was formed. The results are shown in Table 5.

Comparative Example 10

Through holes having a diameter of 0.04 mm were formed by laser processing in the graphite film so that the pitch between the through holes was 0.30 mm (distance between outer diameters of through holes: 0.26 mm, hole area ratio: 1.4%). Then, the graphite film was subjected to copper plating to form a copper layer on both sides of the graphite film and inside the through holes. The thickness of plating on both sides was 20 μm (thickness of plating on one side: 10 μm). In this way, a graphite composite film having a through-hole part copper area ratio of 1.0% and a thickness of 60 μm was formed. The results are shown in Table 5.

TABLE 5

| | | Sample preparation conditions | | | | | | |
|---|---|---|---|---|---|---|---|---|
| | | | GS | | | | | Copper layer |
| | Sample | Total thickness/ μm | Thickness/ μm | Through hole diameter/mm | Pitch between through holes/mm | Distance between outer diameters of through holes/mm | Hole area ratio/% | Thickness (both sides)/μm |
| Comparative Example 2 | GS | 40 | 40 | — | — | — | — | — |
| Comparative Example 10 | Copper-plated | 60 | 40 | 0.04 | 0.30 | 0.26 | 1.4 | 20 |
| Example 19 | GS | 60 | 40 | 0.04 | 0.20 | 0.16 | 3.1 | 20 |
| Example 7 | | 60 | 40 | 0.04 | 0.15 | 0.11 | 5.6 | 20 |
| Example 20 | | 60 | 40 | 0.04 | 0.10 | 0.06 | 12.6 | 20 |

| | Sample preparation conditions Copper layer | | Evaluation results | | | | | |
|---|---|---|---|---|---|---|---|---|
| | | | Holding | | Soldering heat resistance | | Heat dissipation performance | |
| | Through-hole part copper area ratio/% | Degree of blockage in through holes | strength (peel test) | | Sample | Sample combined with epoxy resin | | Center temperature |
| | | | Delamination site | Evaluation | Sample only | | Evaluation | of heating element/° C. |
| Comparative Example 2 | — | — | GS-GS | B | — | B | A | 62.9 |
| Comparative Example 10 | 1.0 | Partially blocked | Metal layer-GS | C | B | A | A | 61.9 |
| Example 19 | 2.4 | Partially blocked | GS-GS | B | A | A | A | 62.0 |
| Example 7 | 4.2 | Partially blocked | Resin-metal layer | A | A | A | A | 62.3 |
| Example 20 | 9.4 | Partially blocked | Resin-metal layer | A | A | A | B | 63.0 |

As can be seen from the results shown in Table 5, when the thickness of copper plating on both sides was as extremely small as 20 μm (thickness of copper plating on one side: 10 μm), Example 20 having a hole area ratio of 12.6% delivered almost the same heat dissipation performance as the non-plated graphite film (Comparative Example 2). As can be seen from this, a graphite composite film that offers higher heat dissipation performance than the graphite film can be obtained by forming through holes in the graphite film at a hole area ratio of 12.0% or less.

Example 21

Figure 5:
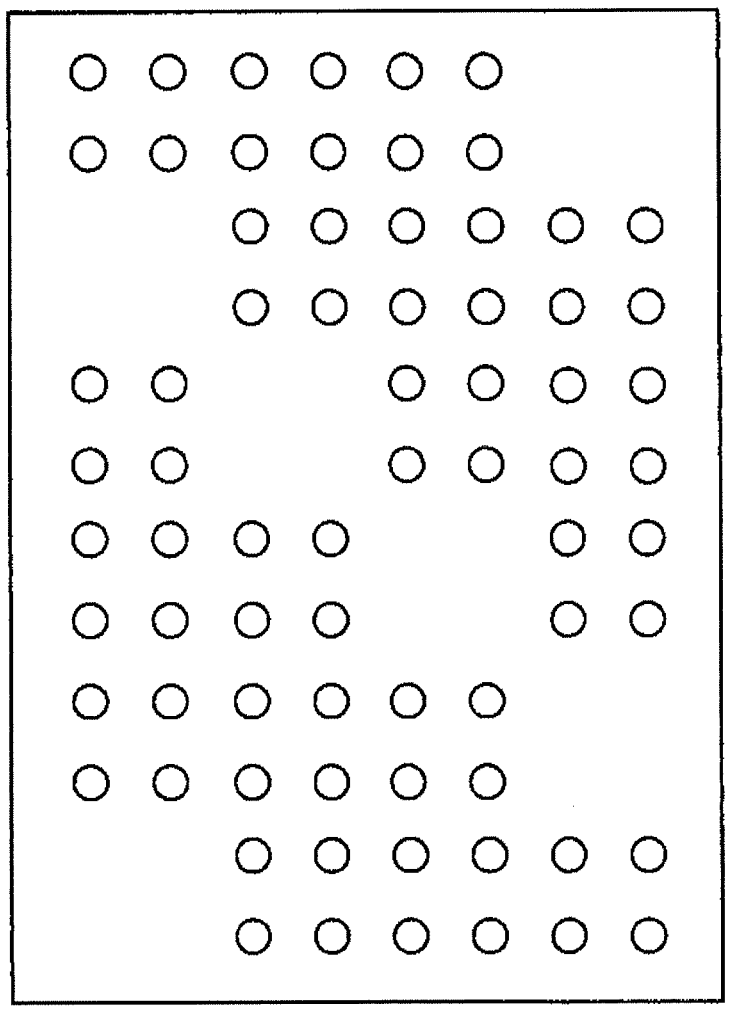
FIG. 5 shows the arrangement of a plurality of through holes formed in a graphite film in Example 21.

As shown in FIG. 5, through holes having a diameter of 0.20 mm were formed by NC drilling in part of the surface of the graphite film whose surface area was 75% of that of the graphite film so that the pitch between the through holes was 0.50 mm (distance between outer diameters of through holes: 0.30 mm, hole area ratio: 9.45%). Then, the graphite film was subjected to copper plating to form a copper layer on both sides of the graphite film and inside the through holes. The thickness of plating on both sides was 20 μm (thickness of plating on one side: 10 μm). In this way, a graphite composite film having a through-hole part copper area ratio of 1.8% and a thickness of 60 μm was formed. The results are shown in Table 6.

Example 22

Through holes having a diameter of 0.20 mm were formed by NC drilling in the graphite film so that the pitch between the through holes was 0.50 mm (distance between outer diameters of through holes: 0.30 mm, hole area ratio: 12.6%). Then, the graphite film was laminated on and fixed to a stainless steel plate and was then subjected to copper plating to form a copper layer on one side of the graphite film and inside the through holes. The thickness of plating on both sides was 10 μm (thickness of plating on one side: 10 μm). In this way, a graphite composite film having a through-hole part copper area ratio of 2.4% and a thickness of 50 μm was formed. The results are shown in Table 6.

Even when through holes were formed in only part of the surface of the graphite film whose surface area was 75% of that of the graphite film as in Example 21, the results were the same as those in Example 1 in which through holes were formed in the entire surface of the graphite film. As can be seen from this, the same effects are produced even when part of the graphite film does not have through holes formed therein. Further, even when the metal layer was formed only on one side of the graphite film and inside the through holes as in Example 22, soldering heat resistance and holding strength were the same as those in Example 1. The reason for this is considered to be that, as shown in FIG. 6, a metal layer having an area corresponding to the area of metal inside the through holes is formed also on the other side of the graphite film on which no metal layer is formed, which makes it possible to suppress peeling-off of the metal layer.

Example 23

Through holes having a diameter of 0.20 mm were formed by laser processing in the graphite film so that the pitch between the through holes was 0.50 mm (distance between outer diameters of through holes: 0.30 mm, hole area ratio: 12.6%). Then, the graphite film was subjected to copper plating to form a copper layer on both sides of the graphite film and inside the through holes. In this way, a graphite composite film having a thickness of plating on both sides of 20 μm (thickness of plating on one side: 10 μm), a through-

TABLE 6

| | | Sample preparation conditions | | | | | | |
|---|---|---|---|---|---|---|---|---|
| | | | GS | | | | | Copper layer |
| | Sample | Total thickness/ μm | Thickness/ μm | Through hole diameter/mm | Pitch between through holes/mm | Distance between outer diameters of through holes/mm | Hole area ratio/% | Thickness (both sides)/μm |
| Example 21 | 75% Copper-plated GS | 60 | 40 | 0.20 | 0.50 | 0.30 | 9.5 | 20 |
| Example 22 | Single side copper-plated GS | 50 | 40 | 0.20 | 0.60 | 0.30 | 12.6 | 10 |
| Example 1 | Double side copper-plated GS | 60 | 40 | 0.20 | 0.50 | 0.30 | 12.6 | 20 |

| | Sample preparation conditions Copper layer | | Evaluation results | | | | | |
|---|---|---|---|---|---|---|---|---|
| | | | Holding | | Soldering heat resistance | | Heat dissipation performance | |
| | Through-hole part copper area ratio/% | Degree of blockage in through holes | strength (peel test) Delamination site | Evaluation | Sample only | Sample combined with epoxy resin | Evaluation | Center temperature of heating element/° C. |
| Example 21 | 1.8 | Partially blocked | GS-GS | B | B | A | B | 62.9 |
| Example 22 | 2.4 | Partially blocked | GS-GS | B | B | A | B | 63.5 |
| Example 1 | 2.4 | Partially blocked | GS-GS | B | B | A | B | 63.1 | hole part copper area ratio of 2.4%, and a thickness of 60 μm was formed as in the case of Example 1. The results are shown in Table 7.

Example 24

Through holes were formed by NC drilling in a 75 μm-thick polyimide film APICAL AH manufactured by KANEKA CORPORATION. Then, dust produced by drilling was removed in an ultrasonic bath. The through holes had a diameter of 0.24 mm and the pitch between the through holes was 0.59 mm.

Then, the polyimide film having through holes formed therein was sandwiched between natural graphite sheets having a thickness of 200 μm, and a heavy slate made of graphite was placed thereon so that a load of 5 g/cm² was applied to the film. The laminated article was placed in a carbonization furnace and carbonized by increasing the temperature in the carbonization furnace to 1400° C. at a temperature rise rate of 0.5° C./min, and was then placed in a graphitization furnace and graphitized by increasing the temperature in the graphitization furnace to 2900° C. at a temperature rise rate of 3.3° C./min. The thus obtained film was compressed at a pressure of 10 MPa to obtain a graphite film having a thickness of 40 μm, a through hole diameter of 0.20 mm, a pitch between through holes of 0.50 mm, a distance between outer diameters of through holes of 0.30 mm, and a hole area ratio of 12.6%. Then, the graphite film was subjected to copper plating to form a copper layer on both sides of the graphite film and inside the through holes. In this way, a graphite composite film having a thickness of plating on both sides of 20 μm (thickness of plating on one side: 10 μm), a through-hole part copper area ratio of 2.4%, and a thickness of 60 μm was formed as in the case of Example 1. The results are shown in Table 7.

Example 25

Through holes were formed in a 75 μm-thick polyimide film APICAL AH manufactured by KANEKA CORPORATION by boring circular holes in the film with a laser marker MD-T1010 manufactured by KEYENCE CORPORATION under conditions of a laser wavelength of 532 nm, a laser power of 80%, a frequency of 100 kHz, and a rate of 50 mm/min. Then, dust produced by laser processing was removed in an ultrasonic bath. The through holes had a diameter of 0.24 mm and the pitch between the through holes was 0.59 mm.

Then, the polyimide film having through holes formed therein was sandwiched between natural graphite sheets having a thickness of 200 μm, and a heavy slate made of graphite was placed thereon so that a load of 5 g/cm² was applied to the film. The laminated article was placed in a carbonization furnace and carbonized by increasing the temperature in the carbonization furnace to 1400° C. at a temperature rise rate of 0.5° C./min, and was then placed in a graphitization furnace and graphitized by increasing the temperature in the graphitization furnace to 2900° C. at a temperature rise rate of 3.3° C./min. The thus obtained film was compressed at a pressure of 10 MPa to obtain a graphite film having a thickness of 40 μm, a through hole diameter of 0.20 mm, a pitch between through holes of 0.50 mm, a distance between outer diameters of through holes of 0.30 mm, and a hole area ratio of 12.6%. Then, the graphite film was subjected to copper plating to form a copper layer on both sides of the graphite film and inside the through holes. In this way, a graphite composite film having a thickness of plating on both sides of 20 μm (thickness of plating on one side: 10 μm), a through-hole part copper area ratio of 2.4%, and a thickness of 60 μm was formed as in the case of Example 1. The results are shown in Table 7.

Example 26

A 75 μm-thick polyimide film APICAL AH manufactured by KANEKA CORPORATION was sandwiched between natural graphite sheets having a thickness of 200 μm, and a heavy slate made of graphite was placed thereon so that a load of 5 g/cm² was applied to the film. The laminated article was placed in a carbonization furnace and carbonized by increasing the temperature in the carbonization furnace to 1400° C. at a temperature rise rate of 0.5° C./min. Then, through holes were formed by boring circular holes in the carbonized film with a laser marker MD-T1010 manufactured by KEYENCE CORPORATION under conditions of a laser wavelength of 532 μm, a laser power of 80%, a frequency of 100 kHz, and a rate of 10 mm/min. The through holes had a diameter of 0.19 mm and the pitch between the through holes was 0.48 mm.

Then, the carbonized film having through holes formed therein was placed in a graphitization furnace and graphitized by increasing the temperature in the graphitization furnace to 2900° C. at a temperature rise rate of 3.3° C./min. The obtained film was compressed at a pressure of 10 MPa to obtain a graphite film having a thickness of 40 μm, a through hole diameter of 0.20 mm, a pitch between through holes of 0.50 mm, a distance between outer diameters of through holes of 0.30 mm, and a hole area ratio of 12.6%. Then, the graphite film was subjected to copper plating to form a copper layer on both sides of the graphite film and inside the through holes. In this way, a graphite composite film having a thickness of plating on both sides of 20 μm (thickness of plating on one side: 10 μm), a through-hole part copper area ratio of 2.4%, and a thickness of 60 μm was formed as in the case of Example 1. The results are shown in Table 7.

TABLE 7

| | | | Evaluation results | | | | | |
|---|---|---|---|---|---|---|---|---|
| | | | | | Soldering heat resistance | | Heat dissipation performance | |
| | | | Holding strength (peel test) | | Sample combined | | Center temperature | |
| | Boring | | Delamination | | Sample | with epoxy | | of heating |
| | Method | Material | site | Evaluation | only | resin | Evaluation | element/° C. |
| Example 1 | Drill | GS | GS-GS | B | B | A | B | 63.1 |
| Example 23 | Laser | GS | Metal layer-GS | C | B | A | B | 63.2 |
| Example 24 | Drill | PI | Resin-metal layer | A | A | A | B | 63.0 |

TABLE 7-continued

| | Boring | | Holding strength (peel test) | | Soldering heat resistance Sample combined | | Heat dissipation performance Center temperature | |
|---|---|---|---|---|---|---|---|---|
| | Method | Material | Delamination site | Evaluation | Sample only | with epoxy resin | Evaluation | of heating element/° C. |
| Example 25 | Laser | PI | Resin-metal layer | A | A | A | B | 63.0 |
| Example 26 | Laser | Carbonized film | Resin-metal layer | A | A | A | B | 63.0 |

Example 1 in which through holes were formed in the graphite film by drilling showed higher holding strength than Example 23 in which through holes were formed in the graphite film by laser processing. This is because when through holes were formed by drilling, formation of burrs around the through holes was reduced, and therefore a metal layer was properly formed inside the through holes. Therefore, it can be said that particularly when through holes are formed in a material having relatively weak mechanical strength such as graphite film, it is necessary to give consideration to a method for forming through holes. Further, when through holes were formed in the polyimide film before graphitization as in Examples 24 and 25, holding strength was improved as compared to when through holes were formed in the graphite film as in Examples 1 and 23. This is because when through holes were formed in the polyimide film before graphitization, formation of burrs around the through holes could be further suppressed, and therefore a metal layer could be properly formed inside the through holes. In this case, excellent results could be obtained in both cases where through holes were formed by drilling and where through holes were formed by laser processing. Further, also in Example 26 in which through holes were formed in the carbonized film obtained by carbonizing the polyimide film, excellent results could be obtained as in the case where through holes were formed in the polyimide film.

REFERENCE SIGNS LIST

1 Through hole diameter
2 Pitch between through holes
3 Distance between outer diameters of through holes
4 Thickness of metal inside through hole
5 Graphite composite film
10 Metal inside through hole
11 Through hole remaining after formation of metal
12 Metal layer formed on surface of graphite film
13 Graphite film
20 Through hole
25 Sample
26 PET tape
27 Gel sheet
28 Heating element
30 Bonding sheet
31 Glass/epoxy plate
32 Polyimide film/copper-laminated film
33 Chuck of peel test machine
35 Sample cut width

The invention claimed is:

1. A graphite composite film comprising a graphite film and a metal layer formed on at least one side of the graphite film, wherein
the graphite film has a plurality of through holes formed therein, the through holes having a distance between outer diameters of the through holes of 0.6 mm or less,
a metal layer is formed also inside the through holes so as to be connected to the metal layer formed on a surface of the graphite film, the metal layer inside the through holes is formed continuously from the one side to an opposite side of the graphite film,
a ratio of an area of metal inside the through holes to an area of the graphite composite film is 1.4% or more, so that peeling-off of the metal layer from the graphite film is suppressed,
the graphite composite film exhibits grade A, B, or C in an evaluation test of soldering heat resistance, when the graphite composite film is immersed in a solder bath at 260° C. for 10 seconds, and
wherein said grade A represents that a distance from an end of delamination between the metal layer and the graphite film is 0.20 mm or less, said grade B represents that a distance from an end of delamination between the metal layer and the graphite film is 0.21 mm to 0.40 mm, and said grade C represents that a distance from an end of delamination between the metal layer and the graphite film is 0.41 mm to 0.60 mm.

2. The graphite composite film according to claim 1, wherein the metal layer on the surface of the graphite film is formed by plating.

3. The graphite composite film according to claim 1, wherein the graphite film has a hole area ratio of 1.4% or more but 40.0% or less.

4. The graphite composite film according to claim 1, wherein the through holes have a diameter of 0.90 mm or less.

5. The graphite composite film according to claim 1, further comprising a solder layer formed on a surface of the metal layer formed on the surface of the graphite film.

6. A method for producing a graphite composite film, comprising the step of forming a metal layer on at least one side of a graphite film having a plurality of through holes formed therein, the through holes having a distance between outer diameters of the through holes of 0.6 mm or less, and inside the through holes to obtain a graphite composite film, wherein a ratio of an area of metal inside the through holes to an area of the graphite composite film is 1.4% or more, wherein the graphite composite film exhibits grade A, B, or C in an evaluation test of soldering heat resistance, when the graphite composite film is immersed in a solder bath at 260° C. for 10 seconds, and wherein said grade A represents that a distance from an end of delamination between the metal layer and the graphite film is 0.20 mm or less, said grade B represents that a distance from an end of delamination between the metal layer and the graphite film is 0.21 mm to 0.40 mm, and said grade C represents that a distance from an end of delamination between the metal layer and the graphite film is 0.41 mm to 0.60 mm.

7. The production method according to claim 6, further comprising the step of forming through holes in a polymer film or a carbonized film as a raw material film and then graphitizing the raw material film by heat treatment to obtain the graphite film having a plurality of through holes formed therein.

8. The production method according to claim 6, further comprising the step of directly forming through holes in a graphite film with a drill or laser to obtain the graphite film having a plurality of through holes formed therein.

9. The graphite composite film according to claim 2, wherein the graphite film has a hole area ratio of 1.4% or more but 40.0% or less.

10. The graphite composite film according to claim 2, wherein the through holes have a diameter of 0.90 mm or less.

11. The graphite composite film according to claim 3, wherein the through holes have a diameter of 0.90 mm or less.

12. The graphite composite film according to claim 2, further comprising a solder layer formed on a surface of the metal layer formed on the surface of the graphite film.

13. The graphite composite film according to claim 3, further comprising a solder layer formed on a surface of the metal layer formed on the surface of the graphite film.

14. The graphite composite film according to claim 4, further comprising a solder layer formed on a surface of the metal layer formed on the surface of the graphite film.

15. The graphite composite film according to claim 1, wherein the graphite film is a graphite film obtained by subjecting a polymer film to heat treatment.

16. The production method according to claim 6, wherein the graphite film is a graphite film obtained by subjecting a polymer film to heat treatment.

17. The graphite composite film according to claim 1, wherein the graphite composite film exhibits said grade A or B.

18. The production method according to claim 6, wherein the graphite composite film exhibits said grade A or B.

* * * * *